United States Patent

Frei et al.

Patent Number: 5,388,477
Date of Patent: Feb. 14, 1995

[54] GEARSHIFT DEVICE FOR ELECTRICALLY CONTROLLED GEARBOXES

[75] Inventors: Walter Frei, Friedrichshafen; Wilhelm Härdtle, Markdorf; Günter Schwarz, Friedrichshafen, all of Germany

[73] Assignee: ZF Friedrichshafen AG, Germany

[21] Appl. No.: 150,158

[22] PCT Filed: May 23, 1992

[86] PCT No.: PCT/EP92/01165

§ 371 Date: Nov. 24, 1993

§ 102(e) Date: Nov. 24, 1993

[87] PCT Pub. No.: WO92/21899

PCT Pub. Date: Dec. 10, 1992

[30] Foreign Application Priority Data

May 27, 1991 [DE] Germany ............... 4117228

[51] Int. Cl.⁶ .......................... F16H 59/04; F16H 63/36
[52] U.S. Cl. ........................... 74/476; 74/473 R; 74/477
[58] Field of Search ........... 74/335, 336 R, 473 R, 74/476, 477, 523, 557, 358.5, 878

[56] References Cited

U.S. PATENT DOCUMENTS

| | | | |
|---|---|---|---|
| 3,894,443 | 7/1975 | Beig et al. | 74/477 X |
| 4,126,055 | 11/1978 | Forsyth | 74/477 X |
| 4,401,866 | 8/1983 | Kaminski | |
| 4,455,885 | 6/1984 | Beig | 74/477 |
| 4,569,246 | 2/1986 | Katayama et al. | 74/523 X |
| 4,631,984 | 12/1986 | Jones | 74/477 X |
| 5,063,817 | 11/1991 | Bogert | 74/878 |
| 5,078,020 | 1/1992 | Hasegawa | 74/473 X |

FOREIGN PATENT DOCUMENTS

| | | |
|---|---|---|
| 2336784 | 2/1975 | Germany. |
| 2502578 | 7/1976 | Germany. |
| 3905768 | 9/1989 | Germany. |
| 57-90446 | 6/1982 | Japan ...................... 74/476 |

Primary Examiner—Allan D. Herrmann
Attorney, Agent, or Firm—Davis, Bujold & Streck

[57] ABSTRACT

A gearshift device for electrically controlled transmissions is provided having a shifting lever pivotable in two parallel planes and guided in slides which have a connecting link only in the area of a neutral shifting position. Such gearshift devices are used particularly in construction machines. By way of a lock, which is activated below an admissible speed, a shift to the neutral position and into the opposite direction of travel is prevented. At higher speeds, accidental faulty shifts are prevented by a step-by-step gearshift mechanism. The locks, according to the invention, require only few regulation measures since they contain two mutually independent locking systems.

2 Claims, 2 Drawing Sheets

GEARSHIFT DEVICE FOR ELECTRICALLY CONTROLLED GEARBOXES

FIELD OF THE INVENTION

The invention concerns a gearshift device for electrically controlled transmissions having a shifting lever pivotable in two parallel planes and guided in slides that are provided with a cross link only in the area of a neutral shifting position. Said shifting lever meshes in the existing shifting position. It is also jointed on a gearshift shaft that is rotatably mounted substantially perpendicularly to the shifting lever and connected therewith by a joint. If the shifting lever is moved from the existing shifting positions, it causes the gearshift shaft with cams, that actuate microswitches which produce signals for the shift of gear, to rotate. A locking disc, which is locked by a locking solenoid in accordance with its position and a specific admissible speed, is also connected with the gearshift shaft.

BACKGROUND OF THE INVENTION

Such gearshift devices are preferably used in heavy industrial motor vehicles and omnibuses. Such devices have been disclosed in DT 25 02 578 C3. Here, the forward gears are situated in a swivel plane of the shifting lever and the reverse gears in another swivel plane parallel therewith. In automatically shifting transmissions, the automatically shifting driving steps are conveniently situated in one swivel plane and the gears to be manually shifted in the other.

Especially in construction site vehicles, it is required that a quick shift from one gear to the other and in the opposite direction of travel be possible. Inadmissible downshifts and reversing operations at too high traveling speeds must be avoided.

Although the gearshift device known already has a detent solenoid which is activated in accordance with the shifting position and the correspondingly admissible speed, the control of said detent solenoid requires a high cost of control in order to ensure that the shifting cycle is not hindered in the admissible limits.

The problem to be solved by the invention is to design a downshift lock for a gearshift device so that it is easier to control, without hindering the gearshifting cycle.

SUMMARY OF THE INVENTION

The point of departure of the invention is that in transmissions for construction machines, a reversing operation below a speed admissible for a second gear is desirable and admissible for the maneuverability of the vehicle. In the selector switch according to the invention, the detent solenoid is not activated in said range so that the reversing operation can be carried out without hindrance. If the speed is above the admissible speed for the second gear, the detent solenoid is activated and engages a stop on the locking disc as soon as the latter is in a position corresponding to the shifting position for the first gear. As long as the detent solenoid is activated, it is not possible to shift to the neutral position and thus no reversing operation can be effected. The reversing lock design is thus effective both in a shift from a forward to a reverse direction and from a reverse to a forward direction.

Since the detent solenoid is always activated above the speed admissible for a second gear but the locking disc has no stops or detents for the detent solenoid in the shifting positions that correspond to the shifting positions for the higher gears, the reversing lock is inactive in said shifting positions. In order to avoid accidental downshifts over several gears, an electrical-mechanical step-by-step gearshift mechanism which, with a periodically controlled locking solenoid, engages the locking disc and briefly locks the locking disc in a given gear position upon a shift into that gear position only allowing a shift from one hear to the next and preenting too swift a shift through a plurality of gears. Such step-by-step gearshift mechanisms are known per se for gearshift devices, DT 23 36 784 A1. The expense for regulation is very low due to the two mutually independent locking systems.

To avoid damages caused by improper use on the locking device, a pushbutton is fastened on the shifting lever over a rubber buffer member. By virtue of the arrangement of the rubber buffer member between the pushbutton and the shifting lever, the shift impact against the locking devices is flexibly muffled in case of improper use without the rubber buffer member unfavorably affecting the ease of movement and the magnitude of the required detent forces of the shifting lever.

DESCRIPTION OF THE PREFERRED EMBODIMENT

Figure 1:
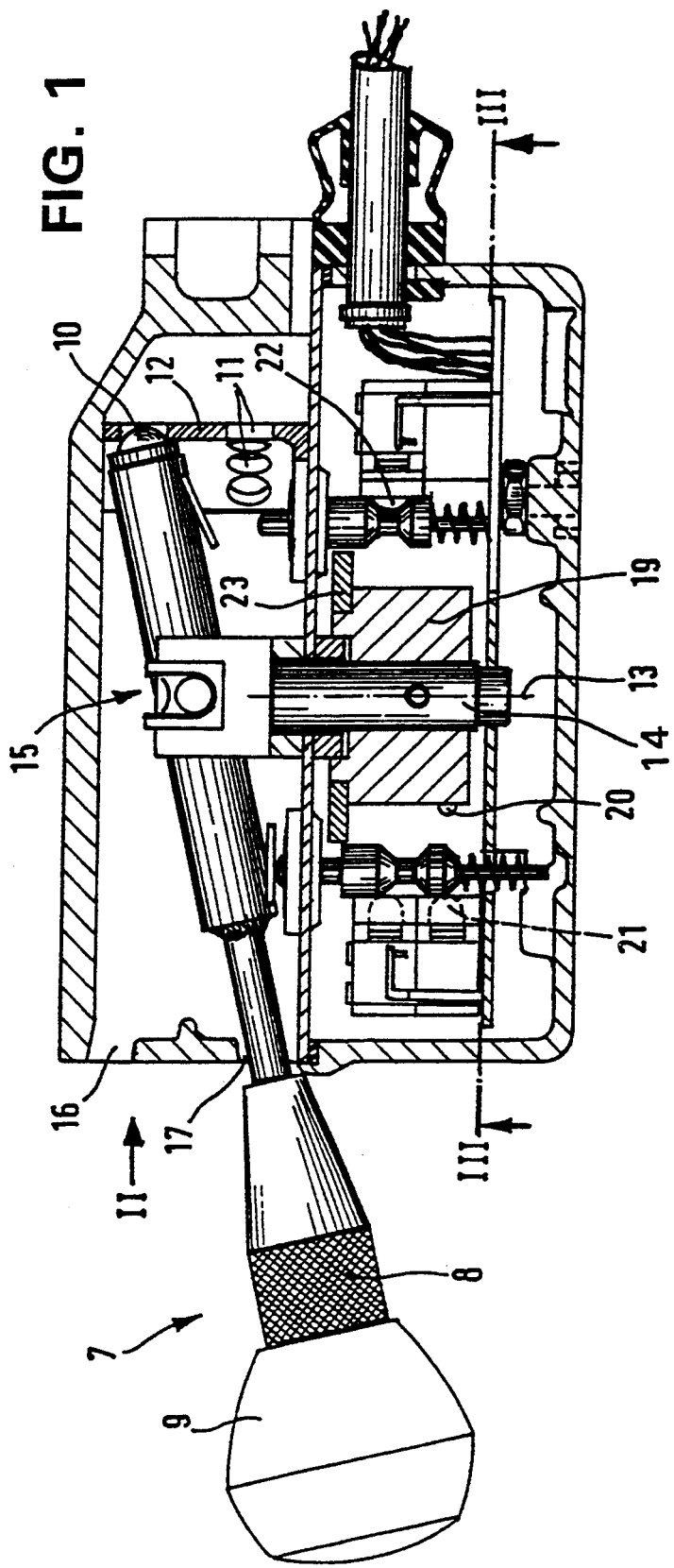
FIG. 1 shows a longitudinal section through a gearshift device.
Figure 2:
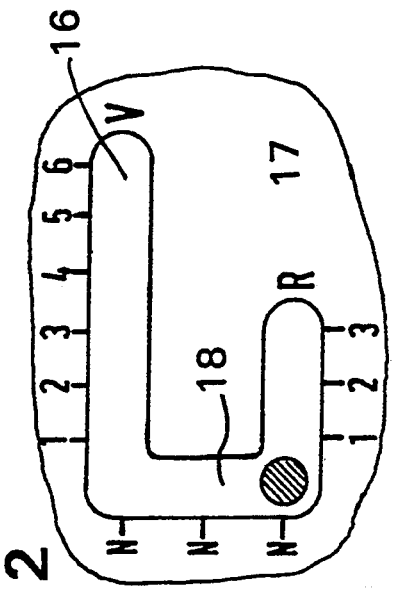
FIG. 2 shows a shifting lever of the gearshift device which is guided in slides.

The gearshift device has a shifting lever 7 firmly connected with a pushbutton 9 via a rubber buffer member 8. On the other end of the shifting lever 7 is a detent ball 10 which, in the respective shifting positions 1–6, engages N in corresponding recesses 11 of a detent plate 12. The shifting lever 7 is pivotally mounted via a joint 15 across an axis of rotation 13 of the gearshift shaft 14.

The shifting lever 7 is guided in two parallel slides 16 and 17, with the slide 16 coordinated with the forward V gears 1 to 6 and the slide 17 with the reverse R gears 1 to 3. The slides 16 and 17 have a cross link 18 for the neutral position N of the shifting lever 7. When the shifting lever 7 moves along the slide 16 or 17, the gearshift shaft 14 and a drum selector gear 19 connected therewith are rotated. The latter has on the periphery cams 20 which, according to the position of the shifting lever 7, engage the microswitches, not shown in detail, for the specific gears. A reversal in a direction of rotation of the transmission is carried out by two switches 21 and 22 which are alternatively actuated by the shifting lever 7 via the cross link 18 upon a change from one slide to the other.

Figure 3:
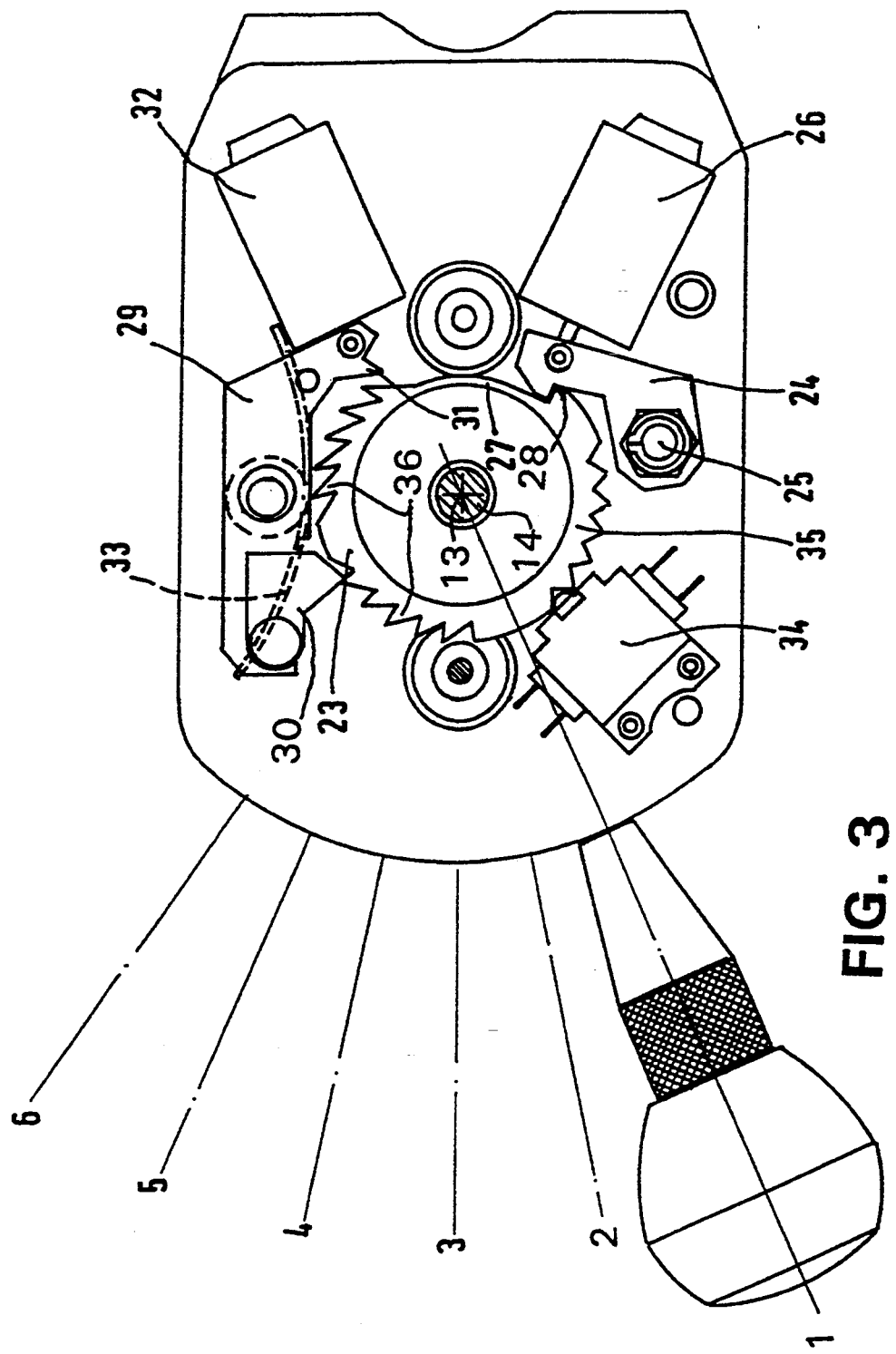
FIG. 3 shows a section along section line A—A in FIG. 1.

A locking disc 23 is firmly connected with the drum selector gear 19 and thus with the gearshift shaft 14. The shape of the locking disc 23, and the parts acting thereon, can be seen in FIG. 3. To them belongs a locking pawl 24 which is pivotally mounted about an axis of rotation 25 parallel with the axis of rotation 13 and pressed into an activated state, against a detent path 27 on the periphery of the locking disc 23, by a detent solenoid 26. At the end of the detent path 27, in the direction toward the neutral position N, is a stop 28 which prevents the shifting lever 7 from being shiftable to the neutral position N when the detent solenoid 26 is activated above an admissible speed for a second gear. If the detent solenoid 26 is not activated, the locking pawl retracts from the detent path 27 and allows a shift to the neutral position N. A change over from a forward to a reverse gear is possible in said position.

An electric-mechanical step-by-step gearshift mechanism, having a two-armed rocker switch 29 with locking teeth 30 and 31 and a locking solenoid 32, also engages with the locking disc 23. The locking teeth 30 and 31 alternatively engage in a locking gearing 36 on the locking disc 23, with the locking tooth 30 being actuated by a leg spring 33 in a direction of the locking gearing 36 and the locking tooth 31 being actuated by the locking solenoid 32 in direction of the locking gearing 36. Upon each gear change, the locking solenoid 32 is briefly activated via time function elements, not shown in detail, so that shifting is possible only from one gear to another gear. The pulses for the activation are produced by a microswitch 34 actuated by cams 35 on the locking disc 23.

In the gearshift device, according to the invention, shifting gradually from the second gear upward is possible while shifting to the neutral position into a change in the direction of travel, is possible only below a specific speed.

Reference numerals 1-6 shifting positions
7 shifting lever
8 rubber buffer member
9 pushbutton
10 detent ball
11 recess
12 detent plate
13 axis of rotation
14 gearshift shaft
15 joint
16 slide
17 slide
18 cross link
19 drum selector gear
20 cam
21 switch
22 switch
23 locking disc
24 locking pawl
25 axis of rotation
26 detent solenoid
27 detent path
28 stop
29 rocker switch
30 locking tooth
31 locking tooth
32 locking solenoid
33 leg spring
34 microswitch
35 cam
36 locking gearing
N neutral position
R reverse travel direction
V forward travel direction

We claim:

1. A gearshift device for a vehicle having an electrically controlled transmissions, comprising:
a rotatably mounted gearshift shaft (14) that is rotated by a shifting lever (7) pivotally connected thereto via a joint (15) having a pivot axis perpendicular to a longitudinal axis (13) of the gearshift shaft (14) such that the shifting lever (7) extends substantially perpendicular relative to the gearshift shaft (14), the shifting lever (7) being guided in two parallel slides (16, 17) extending transverse to the gearshift shaft (14), a first slide (16) having a plurality of forward gear positions (1-6) and a neutral position (N) spaced thereon and a second slide (17) having a plurality of reverse gear positions (1-3) and a neutral position (N) spaced thereon, and in a cross slide (18) extending perpendicular to the two parallel slides (16, 17) connecting them together only in the area of the neutral shifting positions, the shifting lever (7) being articulated along said slides into selective engagement with respective shifting positions (1-6, N) by a driver; wherein
a locking disc (23) is firmly connected to the gearshift shaft (14) such that a stop (28) that extends from an outer edge of the locking disk (23) is in a location corresponding to a first gear position on the two parallel slides, and a detent solenoid (26) is located adjacent the locking disc (23), the solenoid (26) is activated when a speed of the vehicle exceeds a speed for a second gear and upon actuation the detent solenoid (26) engages an edge of the locking disc (23) and engages the stop (28) upon an articulation of the shift lever (7) into a first gear position thereby preventing the shift lever from being articulated into the neutral position and preventing a shift from one of reverse to forward and forward to reverse.

2. A gearshift device according to claim 1, comprising an electric-mechanical step-by-step gearshift mechanism (29-35) having a locking solenoid (32) that engages the locking disc (23) upon actuation of the locking solenoid (32), wherein the locking solenoid is briefly activated upon each gear change thereby briefly locking the locking disk in place and preventing the shift lever (7) from being too swiftly articulated through a plurality of gear positions.

* * * * *